United States Patent [19]

Carroll et al.

[11] 4,452,923

[45] Jun. 5, 1984

[54] POLYMER-MODIFIED POLYOLS

[75] Inventors: William G. Carroll, Lancashire; Peter Farley, Manchester, both of England

[73] Assignee: Imperial Chemical Industries PLC, London, England

[21] Appl. No.: 400,222

[22] Filed: Jul. 20, 1982

[30] Foreign Application Priority Data

Oct. 28, 1981 [GB] United Kingdom ............... 8132538

[51] Int. Cl.³ ............................................ C08G 18/14
[52] U.S. Cl. ............................... 521/167; 252/182;
    524/198; 524/377; 524/728; 524/762; 525/409
[58] Field of Search ................... 521/167; 252/182;
    524/198, 377, 728, 762; 525/409

[56] References Cited

U.S. PATENT DOCUMENTS 4,374,209  2/1983  Rowlands ........................... 525/409

FOREIGN PATENT DOCUMENTS

| 35687 | 2/1981 | European Pat. Off. . |
| 32380 | 8/1981 | European Pat. Off. . |
| 1044267 | 9/1966 | United Kingdom . |
| 1053131 | 12/1966 | United Kingdom . |
| 1453258 | 10/1976 | United Kingdom . |
| 1482213 | 8/1977 | United Kingdom . |
| 1501172 | 2/1978 | United Kingdom . |
| 1571184 | 7/1980 | United Kingdom . |

OTHER PUBLICATIONS

Spitler et al., J. Cellular Plastics 17(1), pp. 43-50, Jan. 1981.

*Primary Examiner*—Maurice J. Welsh
*Attorney, Agent, or Firm*—Cushman, Darby & Cushman

[57] ABSTRACT

A high-strength polymer-modified polyol comprises a polyol and from 40 to 80% by weight of the reaction product of a polyisocyanate and a tertiary-N-polyolamine based on the combined weight of the polyol and reaction product.

Also included are methods of forming the polymer-modified polyol; a polymer-modified polyol obtained by dilution of the high strength polymer-modified polyol; the use of the polymer-modified polyols in the manufacture of polyurethane products and the polyurethane products so obtained.

The polymer-modified polyols are particularly useful for preparing highly resilient flexible foams.

10 Claims, No Drawings

POLYMER-MODIFIED POLYOLS

This specification describes an invention which relates to polymer-modified polyols useful in the manufacture of polyurethane products.

Polyurethane products are made in known manner by reacting a polyisocyanate with a polyol. A blowing agent is added to produce a foamed product and usually one or more other additives are present.

It is known to modify the physical properties of polyurethane foam by using polymer-modified polyols, i.e. polyols containing additional polymeric materials. Such polymer-modified polyols are described in, for example, U.K. Pat. No. 1,453,258. These are dispersions of polyureas and polyhydrazodicarbonamides in polyethers obtained by reacting polyisocyanates with primary and secondary amines, hydrazines or hydrazides in polyethers. Their use in making polyurethane foam is described in U.K. Pat. No. 1,501,172.

Other polymer-modified polyol dispersions are described in Belgian Pat. No. 887,514. These comprise a polyol and the reaction product of a polyisocyanate and an olamine. An olamine is defined as an organic compound having one or more hydroxyl groups and one or more amine groups.

The concentration of these dispersions is in the range of from 1 to 40% by weight of the dispersed particle based on the weight of the polyol. When used to make polyurethane products they are made at or diluted with polyol to a concentration in the range of from 1 to 10%, usually nearer 10%.

The present invention concerns novel polymer-modified polyols for improving the properties of polyurethane foams, especially the tensile properties of high resilience polyurethane foams.

According to one aspect of the invention there is provided a high strength polymer-modified polyol comprising a polyol and from 40 to 80%, preferably from 45 to 70% and especially about 50% by weight of the reaction product of a polyisocyanate and a tertiary-N-polyolamine, as hereinafter defined, based on the combined weight of the polyol and reaction product.

Other aspects of the invention include methods of forming the polymer-modified polyol; a polymer-modified polyol obtained by dilution of the high strength polymer-modified polyol; the use of the polymer-modified polyols in the manufacture of polyurethane products, especially polyurethane flexible foam; and the polyurethane products so obtained.

The polymer-modified polyols of the present invention are dispersions of a poly-addition product of a polyisocyanate and a tertiary-N-polyolamine in a polyol.

The term "high strength" is used to distinguish the polymer-modified polyol of the present invention which is made containing 40 to 80% of the polyaddition reaction product from polymer-modified polyols made containing less than 40% of a polyaddition reaction product. These latter polymer-modified polyols are termed "low strength".

The polyol used in the invention may be any of the polyols used in the manufacture of polyurethanes or mixtures thereof. These polyols contain two or more hydroxyl groups. They are well known to polyurethane technologists and are documented in the relevant literature. Normally the polyol will be a polymeric polyol such as a polyether, polythioether, polyester, polyesteramide, polyacetal or polycarbonate or a mixture thereof. Of particular interest, however, are polyether polyols having a molecular weight of from 200 to 10,000, especially from 1,000 to 10,000, such as are described in British Pat. No. 1,482,213. Suitably they are polyoxyalkylene polyols obtained by reacting an alkylene oxide or mixture of alkylene oxides with an active hydrogen-containing initiator. Ethylene oxide-tipped polyoxypropylene polyols are especially useful for the manufacture of high resilience flexible polyurethane foams. Other poly(oxypropylene-oxyethylene)-polyols in the form of random or block copolymers are also useful.

Any suitable organic polyisocyanate, i.e. an organic isocyanate having two or more isocyanate groups, may be used in the invention including aliphatic, cycloaliphatic, araliphatic, aromatic and heterocyclic polyisocyanates. Such isocyanates are well known to polyurethane technologists and are documented in the relevant literature (see, for example, British Pat. No. 1,453,258). Of particular interest are the aromatic polyisocyanates, for example tolylene diisocyanate (TDI) and diphenylmethane diisocyanate (MDI) which are commercially available in substantially pure and crude forms. More particularly these include 2,4 and 2,6-tolylene diisocyanates and mixtures thereof; diphenylmethane-2,4'-and-4,4'-diisocyanates and mixtures thereof (generally referred to as pure MDI), for example, a mixture containing from 70 to 100%, especially 80%, by weight of the 4,4'-isomer and from 0 to 30%, especially 20%, by weight of the 2,4'-isomer; mixtures of MDI with polyphenyl polymethane polyisocyanates made by phosgenating a mixture of polyamines which is obtained by condensing aniline with formaldehyde (generally referred to as crude or polymeric MDI); and mixtures of TDI and MDI, pure or crude, for example, a mixture containing 60% by weight of TDI and 40% by weight of MDI. There may also be used diisocyanates which have been modified in known manner to introduce a significant isocyanurate, carbodiimide, uretonimine, buiret or allophanate content. Other polyisocyanates which may be used include isocyanate-ended prepolymers, for example, reaction products of a diisocyanate with a deficiency of one or more low molecular weight polyols such as trimethylolpropane, dipropylene glycol or tripropylene glycol.

By the term "tertiary-N-polyamine" is meant an organic compound having two or more hydroxyl groups and one or more tertiary amine groups. Having two or more active hydrogen atoms the polyolamine can react polyfunctionally with the polyisocyanate to form a polyaddition product. Depending on the proportion of polyisocyanate and polyolamine used, all or some of the active hydrogen atom may, in fact, react with isocyanate groups.

Suitably the polyolamine is a tertiary alkanolamine. Preferably it is a trialkanolamine in which the alkyl moieties contain from 1 to 4 carbon atoms. Examples are triisopropanolamine and triethanolamine, the latter being of particular interest.

The quality of the polyamine used is important and certain commercial grades may not be suitable. For instance, the use of a commercial grade of triethanolamine containing 83 to 85% by weight of triethanolamine, about 15% by weight of diethanolamine and 1 to 2% of monoethanolamine has been found to load to gelling of the polymer-modified polyol. It is thought that the presence of primary and secondary amine groups may have an adverse effect and should be avoided. A substantially pure grade of triethanolamine containing 98% by weight of pure triethanolamine, 2% by weight of diethanolamine and trace amounts of monoethanolamine, is, however, quite satisfactory.

According to another aspect of the invention there is provided a method of forming the high strength polymer-modified polyol in which a polyisocyanate is reacted with a tertiary-N-polyamine in the presence of a polyol, the combined weight of the polyisocyanate and polyolamine used being from 40 to 80%, preferably from 45 to 70% and especially about 50% of the combined weight of the polyisocyanate, polyolamine and polyol.

In carrying out this method, the polyisocyanate and polyolamine are mixed together in the presence of the polyol in amounts such that the ratio of isocyanate groups to hydroxyl groups supplied by the polyolamine is from 0.33:1 to 1:1, preferably at least 0.66:1 and especially 0.85:1. Generally, the tensile strengths of high resilience foams are improved when the ratio of isocyanate to hydroxyl groups is increased within the prescribed range.

The reaction may be catalysed, if necessary, by a catalyst of the type and in an amount conventionally used for the formation of polyurethanes, for example, an organometallic compound such as stannous octoate and dibutyl tin dilaurate or an amine such as triethylene diamine.

A batch process may be used in which one of the polyolamine and polyisocyanate reactants is dissolved or dispersed in the polyol followed by the addition, with agitation, of the other reactant. The speed at which the other reactant is added and the degree of agitation are important to ensure a good dispersion. For instance, to obtain a 50% by weight dispersion in a polyol of the reaction product of equimolecular amounts of TDI and 98% pure triethanolamine based on the combined weight of the reaction product and polyol, the TDI is suitably added to a mixture of the triethanolamine and polyol over 5 to 10 minutes with good agitation. A slower addition over say 20 to 60 minutes or a faster or instantaneous addition with inadequate agitation can lead to gelling of the final product. The best conditions will depend on the nature and quantity of ingredients used and are easily determined by routine experiment.

Alternatively, the polymer-modified polyol may be formed by a continuous in-line blending process. In this process the polyolamine, polyisocyante and polyol are pumped at controlled rates and may be mixed simultaneously or one reactant may be mixed firstly with the polyol followed by addition and mixing of the other reactant.

Normally it will be sufficient to add the components at room temperature allowing the temperature to rise through the exothermic reaction.

The polymer-modified polyol of the invention is useful in the manufacture of polyurethane products, especially polyurethane foams, being used in diluted form as the polyol component of flexible, elastomeric, semi-rigid and rigid foams.

The nature of the foam will depend on the particular polyol chosen in preparing the polymer-modified polyol and also on the polyisocyanate and other ingredients conventionally used in the manufacture of polyurethane foams. They may be selected in known manner to produce the type of foam desired.

Polyisocyanates which may be used in making polyurethane products are comprehensively described in relevant literature and include the organic polyisocyanates described hereinbefore for the preparation of the polymer-modified polyol. The particular polyisocyanate used may be the same or different from that used to prepare the polymer-modified polyol.

The polymer-modified polyol of the invention is of particular value in making highly resilient flexible foams for cushioning and similar applications. These types of foam and their method of manufacture are well-known in the polyurethane foam industry. Such foams made from the polymer-modified polyols of the invention have advantages in respect of increased hardness and shrinkage properties. For foams of this type the polymer-modified polyol is usefully prepared from polyoxyalkylene polyols, especially ethylene oxide-tipped polyoxypropylene polyols, and reacted with TDI, pure or crude MDI, or mixtures of TDI or a TDI prepolymer or pure or crude MDI.

Before use, the high strength polymer-modified polyol may be diluted to give a dispersion in which the polyaddition reaction product is less than 40%, preferably from 1 to 15%, and especially about 10%, by weight of the combined weight of the reaction product and polyol. This diluted polymer-modified polyol forms another aspect of this invention. Surprisingly it gives better tensile properties in high resilience polyurethane foams than a similar strength polymer-modified polyol obtained by dilution of a low strength product. The polyol used for dilution may be the same or a different polyol to the one used to make the high strength product.

In a preferred embodiment of the invention, part of the polyisocyanate used to make the high-strength polymer-modified polyol is withheld and added at a later stage. This assists processing and avoids gelling when larger amounts of isocyanate are used.

Thus according to yet another aspect of the invention, there is provided a method of forming a polymer-modified polyol which comprises the steps of
(a) reacting a polyisocyanate with a tertiary-N-polyolamine in the presence of a polyol;
(b) adding more of the same or a different polyisocyanate; and
(c) optionally adding before or after step (b), preferably after, more of the same or a different polyol to reduce the concentration of the reaction product so formed;
the total amount of polyisocyanate used being such that the ratio of isocyanate groups to hydroxyl groups supplied by the polyolamine is from 0.33:1, preferably at least 0.66:1 and especially 0.85:1 and the combined weight of the total polyisocyanate and polyolamine used being from 40 to 80% of the combined weight of the polyisocyanate, polyolamine and the polyol discounting the polyol optionally added in step (c).

The amount of polyisocyanate used in step (a) is such that the ratio of isocyanate groups to hydroxyl groups supplied in total by the polyolamine is, in the preferred case, about 0.5:1 and in step (b) 0.16:1 to 0.35:1. Step (b) is preferably commenced after the reaction of step (a) is complete. This can be determined by monitoring the reaction's exotherm.

When the polymer-modified polyol is to be used in the manufacture of high resilience foams the concentration of the reaction product is preferably reduced from 40 to 80% to 1 to 15% by weight of the combined weight of the reaction product and polyol.

Other conventional ingredients may be used in making the polyurethanes. These include catalysts, for example, tertiary amines and organic tin compounds, surfactants, cross linking or chain lengthening agents, for example, low molecular weight diols, triols and diamines, flame proofing agents, for example, halogenated alkyl phosphates, fillers and pigments. Blowing agents used for forming polyurethane foams include water, which reacts with the polyisocyanate to form carbon dioxide, and inert low boiling liquids such as halogenated hydrocarbons, examples of which are trichlorofluoromethane and dichlorodifluoromethane. Foam stabilisers, for example polysiloxane-polyalkylene oxide block copolymers, may be used to stabilise or regulate the cells of the foam.

The amount of these minor ingredients and blowing agents used will depend on the nature of the product required and may be varied within limits well known to a polyurethane foam technologist. In the case of highly resilient water blown flexible foams, it is appropriate to use from 1.0 to 5.5%, preferably from 1.5 to 4.0%, by weight of water based on the weight of the polyol component. An inert low boiling liquid may be used as an additional blowing agent if it is desired to reduce the foam density.

In general, the composition of the foam-forming reaction mixture should be such that the ratio of isocyanate groups to active hydrogen atoms is within the range of 0.7:1 to 1.2:1, preferably 0.8:1 to 1.1:1.

One shot, prepolymer or quasi-prepolymer methods may be employed as may be appropriate for the particular type of polyurethane being made.

The components of the polyurethane forming reaction mixture may be mixed together in any convenient manner, for example by using any of the mixing equipment described in the prior art for the purpose. If desired, some of the individual components may be pre-blended so as to reduce the number of component streams requiring to be brought together in the final mixing step. It is often convenient to have a two-stream system whereby one stream comprises a polyisocyanate or prepolymer and the second stream comprises all the other components of the reaction mixture.

The invention is illustrated by the following Examples in which all parts and percentages are by weight unless otherwise indicated.

EXAMPLE 1

Preparation of Polymer-Modified Polyols 22.97 Parts of 98%; pure triethanolamine were thoroughly mixed with 50 parts of an oxypropylated glycerol polyether tipped with 16% ethylene oxide and having a molecular weight of 6000. This polyether is referred to as Polyether X. With good agitation, 27.05 parts of 80:20 TDI were added over 5 to 10 minutes to form a high strength (50%) dispersion of a polymer-modified polyol. No catalyst was used. The high strength dispersion was diluted to 10% using more of Polyether X. This 10% dispersion is called Polyol A.

The quantities of TDI and triethanolamine used were such that the ratio of isocyanate groups to hydroxyl groups supplied by the triethanolamine was approximately 0.66:1.

By way of comparison a polymer-modified polyol, called Polyol B was prepared in the same way as Polyol A except that it was made directly as a 10% dispersion by adding 5.33 parts of the TDI to a mixture of 90 parts of Polyether X and 4.67 parts of the triethanolamine. 0.03 Parts of dibutyl tin dilaurate catalyst were required to form the isocyante/polyolamine polyaddition reaction product.

Preparation of High Resilience Foams

High resilience foams were formed from mixtures prepared by mixing together the following ingredients.

|  | Foam A Parts | Foam B Parts |
| --- | --- | --- |
| Polyol A | 80 | — |
| Polyol B | — | 80 |
| Polyether X | 20 | 20 |
| Water | 2.8 | 2.8 |
| Solid 1,4-diazabicyclo[222]octane | 0.08 | 0.08 |
| N—ethylmorpholine | 0.8 | 0.8 |
| Niax A1 | 0.08 | 0.08 |
| Silicone B4113 | 1.5 | 1.5 |
| Dibutyl tin dilaurate | 0.03 | 0.03 |
| A mixture of 80:20 TDI and polymeric MDI to give an Isocyanate Index of 100 | 36.2 | 36.2 |

Foams A and B made from Polyols A and B, respectively, had the following properties.

|  | Foam A | Foam B |
| --- | --- | --- |
| Density (kg/m$^3$) (Overall) | 47 | 47 |
| (Core) | 37 | 38 |
| Compression set (%) | | |
| (50%) | 8 | 9 |
| (75%) | 10 | 11 |
| (90%) | 14 | 12 |
| Tensile strength (kN/m$^2$) | 110 | 110 |
| Elongation at break (%) | 145 | 105 |
| Tear strength (N/m) | 400 | 305 |
| Compression hardness (kN/m$^2$) | | |
| (25%) | 1.8 | 2.0 |
| (40%) | 2.5 | 2.7 |
| (50%) | 3.1 | 3.6 |
| (65%) | 6.1 | 6.6 |
| Resilience (%) | 54 | 48 |

Results

It will be seen that Foam A, which was prepared from a diluted high strength polymer-modified polyol of the invention had superior tensile properties in respect of elongation at break and tear strength over Foam B, which was prepared from a polymer-modified polyol made at low strength.

EXAMPLE 2

A diluted high strength polymer-modified polyol, called Polyol C, was prepared in the same way as Polyol A in Example 1 except that 19.9 parts of the triethanolamine and 30.1 parts of the TDI were used to form the polyaddition reaction product.

These quantities of TDI and ethanolamine were such as to give a ratio of isocyanate groups to hydroxyl groups supplied by the triethanolamine of approximately 0.85:1.

A high resilience foam, called Foam C, was made in the same way as Foam A in Example 1 except that the 80 parts of Polyol A were replaced by 80 parts of Polyol C.

For control purposes, a Foam D was prepared alongside Foam C using a procedure similar to that used for Foam A in Example 1.

Foams C and D has the following properties.

|  | Foam C | Foam D |
|---|---|---|
| Overall Density (kg/m$^3$) | 48 | 48 |
| Tensile Strength (kN/m$^2$) | 105 | 95 |
| Elongation at break (%) | 175 | 140 |
| Tear strength (N/m) | 510 | 440 |

Results

It will be seen that Foam C, made from a diluted high strength polymer-modified polyol employing a ratio of isocyanate groups to hydroxyl groups supplied by the triethanolamine of approximately 0.85:1, has superior tensile properties, particularly in respect of elongation at break and tear strengths, over Foam D made from a diluted high strength polymer-modified polyol employing a ratio of isocyanate groups to hydroxyl groups supplied by the triethanolamine of approximately 0.66:1.

EXAMPLE 3

Preparation of a Polymer-Modified Polyol 26.55 Parts of 98% pure triethanolamine were mixed with 50 parts of the Polyether X used in Example 1. 23.45 Parts of 80:20 TDI were added over one minute with rapid stirring which was continued for 5 minutes. The high strength (50%) dispersion of a polymer-modified polyol so formed was diluted with 233.75 parts of Polyether X, and 3.75 parts of 80:20 TDI were added with stirring.

A 10% dispersion of a diluted high strength polymer-modified polyol was obtained.

The ratio of isocyanate groups to hydroxyl groups supplied by the triethanolamine had been increased from about 0.5:1 to about 0.66:1 after dilution.

By comparison, a 50% dispersion made in the same way except using 23.08 parts of 98% pure triethanolamine and 26.92 parts of 80:20 TDI, was viscous and lumpy and, when diluted to 10%, formed aggregates. In this case the ratio of isocyanate groups to hydroxyl groups supplied by the triethanolamine was initially 0.66:1.

This Example demonstrates the advantage of using a two-stage isocyanate addition process for preparing the polymer-modified polyol.

We claim:

1. A polymer-modified polyol obtained by reacting a polyisocyanate with a tertiary-N-polyolamine in the presence of a first polyol in amounts such that the weight of the reaction product of the polyisocyanate and polyolamine is from 40 to 80% of the combined weight of the reaction product and first polyol and subsequently diluting the reaction product with a second polyol, which is the same as or different to the first polyol, to less than 40% by weight of the reaction product on the combined weight of the reaction product and polyols.

2. A polymer-modified polyol according to claim 1 in which the first polyol is a polyoxyalkylene polyol having a molecular weight of from 1,000 to 10,000.

3. A polymer-modified polyol according to claim 1 in which the tertiary-N-polyolamine is a trialkanolamine in which the alkyl moieties contain from 1 to 4 carbon atoms.

4. A polymer-modified polyol according to claim 1 in which the reaction product is subsequently diluted to 1 to 15% by weight of the reaction product on the combined weight of the reaction product and polyols.

5. In a method of making a polyurethane product in which a polyisocyanate is reacted with a polyol, the improvement which comprises using as the polyol component a polymer-modified polyol obtained by dilution of the polymer-modified polyol as claimed in claim 1 with the same or a different polyol so that the reaction product is less than 40% by weight of the combined weight of the reaction product and polyol.

6. A method according to claim 5 in which the polyurethane product is a flexible polyurethane foam.

7. Polyurethane products obtained by the method of claim 5.

8. A method of forming a polymer-modified polyol which comprises the step of
  (a) reacting a polyisocyanate with a tertiary-N-polyolamine in the presence of a first polyol in amounts such that the weight of the reaction product of the polyisocyanate and polyolamine is from 40 to 80% of the combined weight of the reaction product and first polyol, and
  (b) subsequently diluting the reaction product obtained in step (a) with a second polyol, which is the same or different to the first polyol, to less than 40% by weight of the reaction product on the combined weight of the reaction product and polyols.

9. A method according to claim 8 in which the polyisocyanate and polyolamine are mixed together in the presence of the first polyol in amounts such that the ratio of isocyanate groups to hydroxyl groups supplied by the polyolamine is from 0.33:1 to 1:1.

10. A method of forming a polymer-modified polyol which comprises the steps of
  (a) reacting a polyisocyanate with a tertiary-N-polyolamine in the presence of a polyol;
  (b) adding more of the same or a different polyisocyanate; and
  (c) optionally adding before or after step (b) more of the same or a different polyol to reduce the concentration of the reaction product so formed;
  the total amount of polyisocyanate used being such that the ratio of isocyanate groups to hydroxyl groups supplied by the polyolamine is from 0.33:1 and the combined weight of the total polyisocyanate and polyolamine used being from 40 to 80% of the combined weight of the polyisocyanate, polyolamine and the polyol discounting the polyol optionally added in step (c).

* * * * *